United States Patent [19]

Nakata et al.

[11] Patent Number: 4,516,221

[45] Date of Patent: May 7, 1985

[54] DATA COMMUNICATION SYSTEM

[75] Inventors: Yukio Nakata, Kawasaki; Matsuaki Terada, Machida; Kaoru Suda, Ohmiya; Motoyoshi Morito, Iruma; Osamu Shiotsu, Ohmiya, all of Japan

[73] Assignees: Hitachi, Ltd.; Yagi Antenna Co., Ltd., both of Tokyo, Japan

[21] Appl. No.: 390,642

[22] Filed: Jun. 21, 1982

[30] Foreign Application Priority Data

Jun. 26, 1981 [JP] Japan ........................ 56-98217

[51] Int. Cl.[3] ........................ H04B 9/00

[52] U.S. Cl. ........................ 364/900; 455/612; 455/607

[58] Field of Search ........................ 364/200, 900, 464; 235/454, 375; 356/4; 455/603, 604, 608, 606, 612, 617, 607; 350/96.15, 96.1, 96.16, 96.2, 425; 358/901, 293; 250/227, 237; 340/870.29, 825.5, 825.54, 870.01

[56] References Cited

U.S. PATENT DOCUMENTS

| | | | |
|---|---|---|---|
| 4,161,650 | 7/1979 | Caovette et al. | 358/901 |
| 4,215,269 | 7/1980 | Kuhn | 455/612 |
| 4,234,969 | 11/1980 | Singh | 455/607 |
| 4,249,266 | 2/1981 | Nakamori | 358/901 |
| 4,276,656 | 6/1981 | Petryk, Jr. | 455/612 |
| 4,317,614 | 3/1982 | Palmer | 455/612 |
| 4,357,606 | 11/1982 | Fortescue | 340/870.29 |
| 4,366,565 | 12/1982 | Herskowitz | 455/612 |
| 4,408,353 | 10/1983 | Bowen et al. | 358/901 |

*Primary Examiner*—Gareth D. Shaw

*Assistant Examiner*—Jameson Lee

*Attorney, Agent, or Firm*—Antonelli, Terry & Wands

[57] ABSTRACT

A data communication system including reflectors having first light emitting elements for radiating light and first light receiving elements for receiving light, a plurality of transceivers disposed confronting said reflectors and having second light emitting elements for radiating light and second light receiving elements for receiving light, and a data processing unit to be connected to the transceivers, wherein light corresponding to the data to be transmitted from the data processing unit is converged and radiated from the second light emitting element of the transceiver to the reflector, the light from the transceiver is received by the first light receiving element of the reflector, light corresponding to the data thus received is radiated from the light emitting element of the reflector to all of the transceivers confronting said reflector and is received by the second light receiving elements of the transceivers, and the data thus received is sent to the data processing unit.

8 Claims, 4 Drawing Figures

TRANSCEIVER 101 102 102 103 103 105 106 104 104

REFLECTOR
REFLECTOR
TRANSCEIVER
TRANSCEIVER
DEVICE
DEVICE
DEVICE
DEVICE
1
2
3
4
4-1
4-2
5
5-1
5-2
6
6-1
6-2
7
7-1
7-2
8
8-1
8-2
9
9-1
9-2
10
11
12
13

TRANSCEIVER
6
LUMINESCENCE DIODE
PHOTO DIODE
OSCILLATOR
OSCILLATOR
DATA SENSING CIRCUIT
6-1
6-2
6-10
6-3
6-4
6-9
6-91
6-92
6-93
6-5
6-6
6-7
6-8
D
CK
Q
S
R
F
DEVICE
10
14
15
16
17
18
19
20

DATA COMMUNICATION SYSTEM

BACKGROUND OF THE INVENTION

This invention relates to a data communication system between in-house devices such as computer terminals and computers.

As in-house distributed processing has spread widely, data communication between a large number of in-house computer terminals and computers has been put into practical use.

FIG. 1 shows a known conventional system for such a data communication system.

The system uses a coaxial cable 101 as the transmission line and the signal in the coaxial cable 101 is led to a computer terminal 105 and a computer 106 through a transceiver 102, a signal line 103 and a connecter 104 that are installed for each room. In accordance with this system, since the terminal 105 and the computer 106 are connected with each other by a wire, the terminal 105 or the computer 106 can not be installed at any position desired by the user. Such an installation only becomes possible by changing the position of the connecter 104 to the desired place with troublesome fitting work.

Since the communication cable is necessary for each terminal 105 or computer 106, the cost of cable installation would increase and congestion would occur if the number of terminals or computers increases.

SUMMARY OF THE INVENTION

It is therefore an object of the present invention to provide a data communication system which makes it possible to easily install terminals or computers at desired positions without causing congestion and at a reduced installation cost.

To accomplish this object, the present invention provides a data communication system comprising light reflecting means having first elements for radiating light and second elements for receiving light, a plurality of light transmitting and receiving means disposed confronting the light reflection means and including first elements for radiating light and second elements for receiving light, and data processing means connected to the light transmitting and receiving means, wherein light corresponding to the data to be transmitted from the data processing means is converged and radiated from the first elements of the light transmitting and receiving means to the light reflecting means, the light from the light transmitting and receiving means is received by the second elements of the light reflection means, the light corresponding to the data thus received is diffused and radiated from the first elements of the light reflection means to all the light transmitting and receiving means opposite thereto and is received by the second elements of the light transmitting and receiving means, and the data thus received is sent to the data processing means.

DESCRIPTION OF THE PREFERRED EMBODIMENTS

The present invention will now be described in detail with reference to the accompanying drawings.

Figure 2:
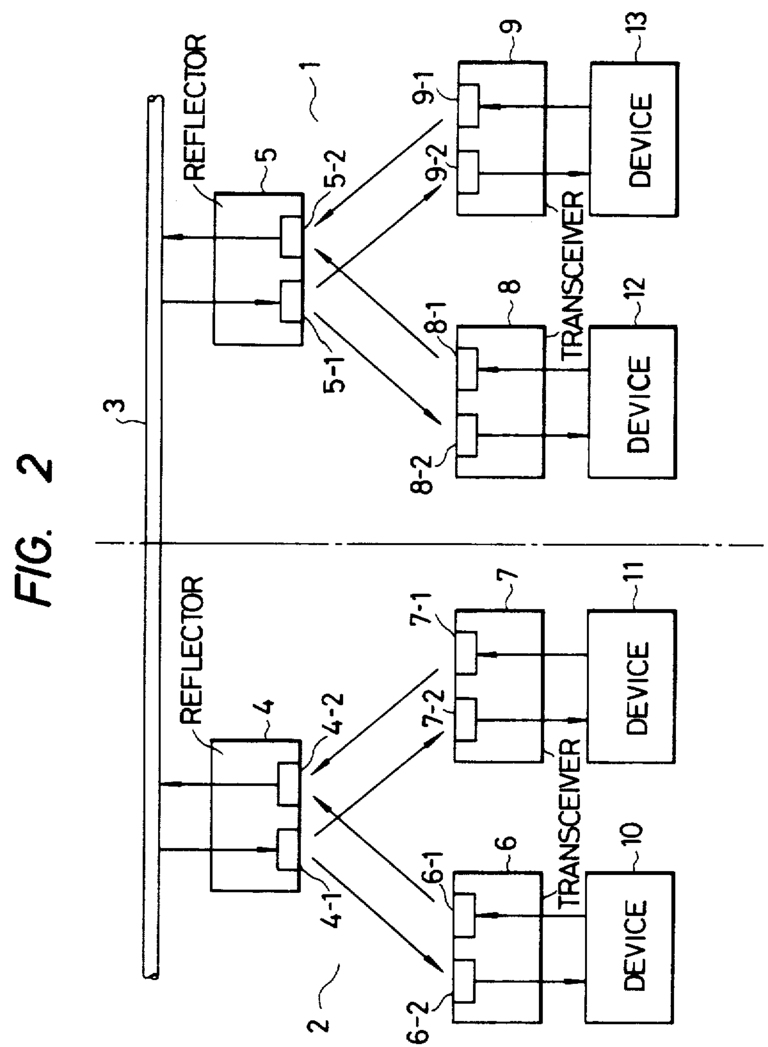
FIG. 2 diagrammatically illustrates the construction of a data communication system in accordance with an embodiment of the present invention.

FIG. 2 shows the construction of a data communication system in accordance with an embodiment of the present invention.

In the drawing, two rooms 1 and 2 are connected with each other by a coaxial cable 3 and reflectors 4 and 5 are T-branched from the coaxial cable 3 at the upper positions of these rooms, respectively.

Transceivers 6, 7 and 8, 9 are disposed at lower positions of the rooms 1 and 2 so as to face the reflectors 4 and 5, respectively, and are connected to terminals such as display terminals or devices 10, 11, 12 and 13 consisting of computers.

The reflectors 4 and 5 include luminescent diodes 4-1 and 5-1 and photo-diodes 4-2 and 5-2. The transceivers 6 through 9 also include luminescent diodes 6-1 through 9-1 and photo-diodes 6-2 through 9-2, respectively.

In the construction described above, the transceivers 6 through 9 receive the data to be transmitted from the corresponding devices 10–13, intensity-modulate infrared rays emitted by the luminescent diodes 6-1 through 9-1, converge the rays, and project them toward the corresponding reflectors 4 and 5. The luminescent diodes 6-1 through 9-1 only emit the infrared rays when data is transmitted from the devices 10 through 13.

The infrared rays projected by the transceivers 6 through 9 are received by the photo-diodes 4-2 and 5-2 of the reflectors 4-2 and 5-2, are converted into electric signal data and delivered to the coaxial cable 3. The data that has been delivered to the coaxial cable 3 is transmitted to all the reflectors connected to the coaxial cable 3, including the reflector that has transmitted the data.

The reflectors 4 and 5 that have received the data from coaxial cable 3 intensity-modulate the infrared rays emitted by the luminescent diodes 4-1 and 5-1 and radiate the rays in such a fashion as to cover all the transceivers 6 through 9 in the rooms. The infrared rays radiated from the reflectors 4 and 5 are received by the photo-diodes 6-2 through 9-2 of the transceivers 6 through 9, are converted into electric signal data and are then transmitted to the devices 10 through 13.

Accordingly, when data is transmitted from a device such as a computer terminal of a given room the data is received not only by all the devices such as the terminals of the other rooms but also by devices such as the terminal of the same room.

The reflectors 4 and 5 have a construction which radiates the infrared rays within a range such that all the terminals disposed inside the respective rooms can simultaneously receive them, and the transceivers 6 through 9 can radiate the converged rays so that the corresponding reflectors 4 and 5 can receive them.

If the communication between the reflectors and the transceivers is effected by means of infrared rays in the abovementioned manner, it is possible to carry out space propagation which is highly resistant to induction noise and does not create interference outside the building.

Figure 3:
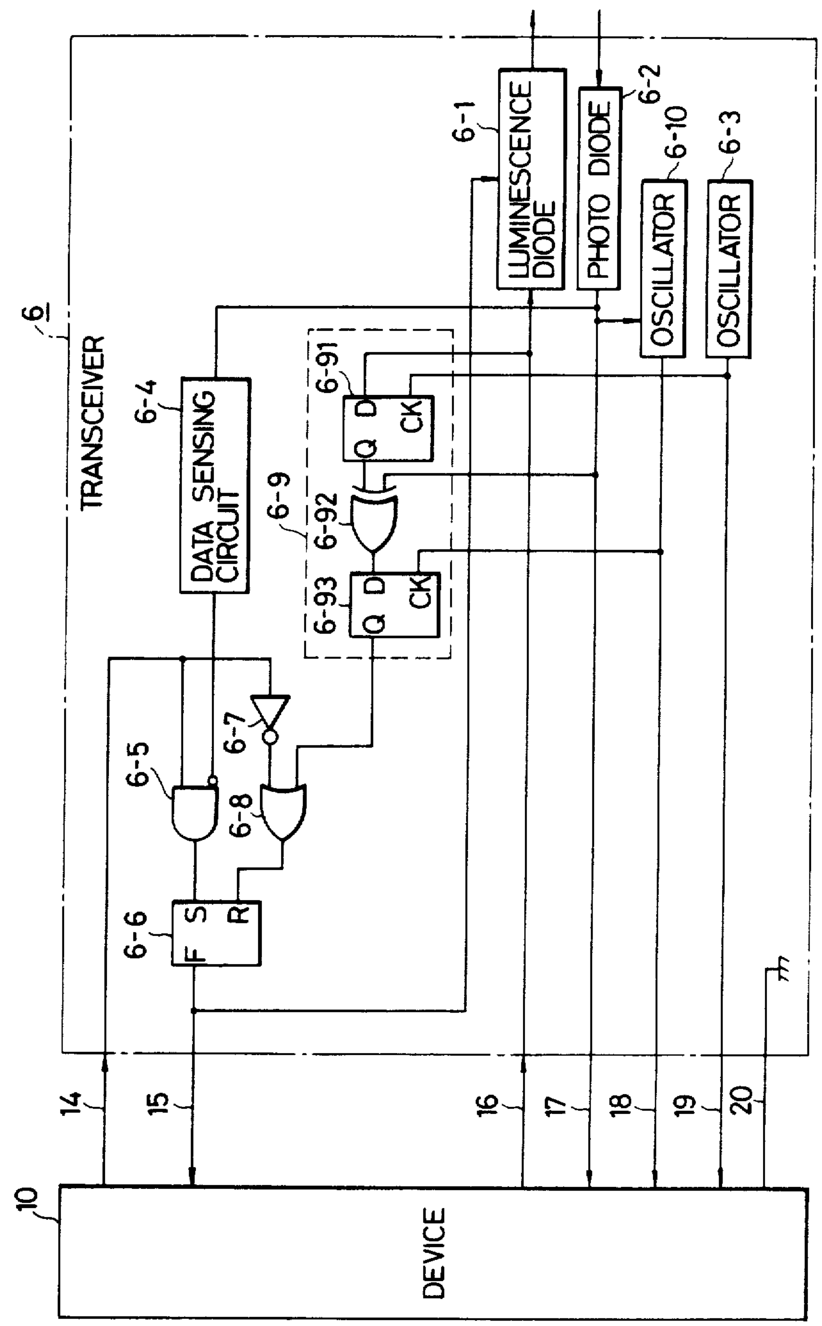
FIG. 3 is a block diagram showing a concrete example of the construction of a transceiver portion of FIG. 2.

FIG. 3 illustrates a concrete example of the construction of each transceiver shown in FIG. 2 and the mode of connecting the transceiver to devices such as the terminals. It has the function of avoiding the collision of data when the data is simultaneously transmitted from a plurality of devices such as the terminals.

Incidentally, the transceiver 6 illustrated in FIG. 3 is an example.

The interface signal line between the device 10 and the transceiver 6 will be explained first with reference to FIG. 3.

A signal of a signal line for a send request 14 is first set to "1" (or is turned on) when the device 10 is to transmit data. The transceiver 6 sets the signal of a signal line for send transmission 15 to "1" when the send request signal from the device 10 is "1" and when data transmission is possible, as will be described below in further detail.

During the period in which the send permission signal is "1", the device 10 delivers the data to be transmitted (sequence of bits "1" and "0") to a transmission data line 16. The transceiver 6 modulates the luminance of the luminescent diode 6-1 according to the data to be transmitted. After receiving data (sequence of bits "1" and "0") on its photo-diode 6-2, the transceiver 6 puts the data on the receiving data line 17 and delivers it to device 10.

The transceiver 6 generates a timing clock signal for transmitting the data by its oscillator 6-3 and sends the signal to the device 10 through a transmission clock line 19. It actuates its oscillator 6-10 with the point of change of the receiving data from the reflector 4 from the bit "0" to "1" as the starting point, generates a receiving data sampling clock so that the sampling clock pulse is generated at an intermediate point of the bits of the receiving data, and sends the sampling clock to a signal line for a receiving clock 18. Incidentally, a signal line for a common ground 20 plays the role of a common retrace line for interface signal lines 14 through 19.

Next, the data transmission and reception operation between the devices 10 through 13 will be described in detail, taking the case where data is transmitted from device 10 to device 12.

Figure 1:
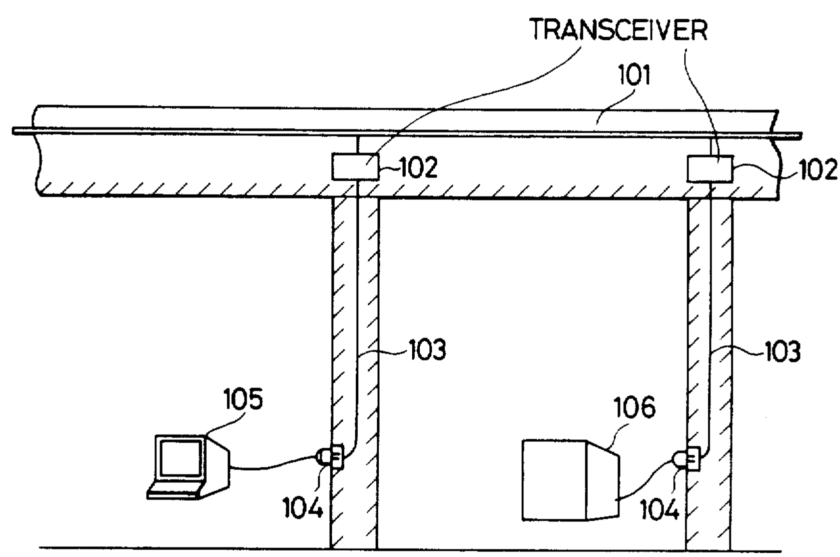
FIG. 1 diagrammatically illustrates the construction of a conventional data communication system.
Figure 4:
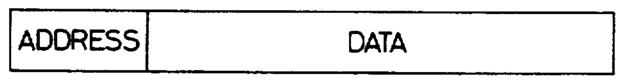
FIG. 4 diagrammatically illustrates the construction of the transmission data.

The devices 10 through 13 have inherent addresses of their own. The data to be transmitted from the device 10 to the device 12 includes the ADDRESS inherent to the device 12 at its leading end and one unit of DATA (which is referred to as a "packet") follows the ADDRESS, as shown in FIG. 4.

The transceiver 6 checks the output of the photodiode 6-2 shown in FIG. 3 with its data sense circuit 6-4 and sets the output of the data sense circuit 6-4 to "0" (or turns it off) when there is no output or when the other transceivers are not transmitting data. When there is an output from photo-diode 6-2 or when another transceiver is transmitting data, the transceiver 6 sets the output of the data sense circuit 6-4 to "1". The device 10 sets the signal of signal line 14 for a send request to "1" before the data transmission. When the send request signal is "1" and when the output of the data sense circuit 6-4 is "0", the transceiver 6 opens an AND gate 6-5 and sets a flip-flop 6-6, thereby changing the signal of the signal line 15 for send transmission to "1". Once the send permission signal is set to "1" by flip-flop 6-6, the signal remains "1" until the send request signal becomes "0" or a collision occurs as will be described below, even if data that has been transmitted by the transceiver 6 and reflected back by the reflector 4 is received by the photodiode 6-2 and the output of the data sense circuit 6-4 becomes "1".

The output of the flip-flop 6-6 sets the send permission signal to "1" and permits the luminescent diode 6-1 to emit light.

The AND gate 6-5 is kept closed and does not set the send permission signal to "1" if the output of the data sense circuit 6-4 is "1", even if the send request signal is "1". Hence, the device 10 does not transmit data and waits until the send permission signal becomes "1", while keeping the send request signal "1". Thereafter, when the output of the data sense circuit 6-4 becomes "0", the flip-flop 6-6 is set and the send request signal is set to "1" so that the device 10 starts transmitting the data. The transmission data transmitted from the device 10 modulates the radiation of light from the luminescent diode 6-1 and sends light to the reflector 4.

When device 10 finishes transmitting the data, the send request signal is changed to "0", and the flip-flop 6-6 is reset by an inverter 6-7 and an OR gate 6-8. Accordingly, the send request signal is changed to "0" and the radiation of light by the luminescent diode 6-1 is terminated.

During the period in which the send permission signal is "1", the transceiver 6 sends data that has been received from the device 10 from the luminescence diode 6-1 to the reflector 4.

The reflector 4 receives the data radiated from the transceiver 6 by its photo-diode 4-2, converts the data into an electric signal and sends the signal to the coaxial cable 3. The data reaches the reflector 5 through the coaxial cable 3 and is transmitted to all the transceivers 8, 9 facing the reflector 5 from its luminescent diode as well as to all the transceivers 6, 7 facing the reflector 4. All these transceivers 6 through 9 receive data from the reflector through their photo-diodes 6-2 through 9-2, convert the data into electric signals and send the signals to the corresponding devices 10 through 13.

Among the devices, device 12 senses the leading end of the received data, determines that it is data directed to its address and takes it in. The rest of the devices other than the device 12 read and discard the data because the data is not addressed to them.

Incidentally, the data transmitted from the transceiver 6 to the reflector 4 is sent back as such from the same reflector 4 and is received by the same transceiver 6. Accordingly, the transceiver 6 is equipped with a collision detecting circuit 6-9 that compares the contents of the transmitted data with that of the received data in units of one bit and produces a logical "0" if they coincide with each other, and a logical "1" if they do not. This operation will be explained in detail below.

The data transmitted on the signal line 16 is sampled with the transmission clock on the signal line 19, is held by one-bit time and is applied to output Q by a D type flip-flop 6-91. A logic circuit 6-92 calculates the exclusive-OR condition between the output of the flip-flop 6-91 and the data received on the signal line 17 and the value is sampled with the receiving clock on the signal line 18 by the D type flip-flop 6-93. Its output is always "0" if the contents of the transmitted data coincides with that of the data being received. Comparison is correct if the deviation between the transmitted data and the receiving data is up to a maximum of one bit.

While the transceiver 6 is transmitting data, the other transceivers do not transmit data because the output of the data sense circuit 6-4 is "1". There is the likelihood, however, that after the data transmission by the transceiver 6, data will be transmitted before the other transceivers detect the end of the data transmission. For instance, it will be assumed that the transceiver 7 transmits data substantially simultaneously with the transceiver 6. In this case, the data of both transceivers 6 and 7 are received by the reflector 4, are added with each other, and the result of addition is again transmitted to these transceivers 6 and 7. Since the added data is different from the data that has been transmitted by the transceivers 6 and 7, respectively, the output of the collision detecting circuits in these transceivers 6, 7 become "1". If the output of the circuit becomes "1", the output of the flip-flop 6-6 in FIG. 3 is reset to "0" and the send permission signal to the devices 10 and 11 becomes "0". If the send permission signal becomes "0" while the send request is "1", the devices 10 and 11 judge the occurrence of a collision and suspend the data transmission. On the other hand, upon detecting the collision, the transceivers 6 and 7 immediately terminate the output of the luminescent diodes. It is only after the send request signal of the devices 10 and 11 becomes "1" and the send permission signal is "1" that the luminescent diodes are again actuated.

After data transmission is suspended as a result of collision, the devices 10 and 11 generate random numbers and again transmit the data from its leading end after the passage of time corresponding to the random numbers.

Incidentally, infrared rays are used in the abovementioned embodiment for the communication between the reflectors and the transceivers, but the present invention is not restricted thereto and can be realized by use of other optical space propagation means.

The number of transceivers facing each reflector is not limited to the one shown in the drawing, either, and may be arbitrary so long as it is plural.

Though the two rooms are connected with each other by the coaxial cable in the abovementioned embodiment, the different positions inside the same room may be connected by the coaxial cable, and transmission lines such as an optical fiber for transmitting the optical signal as such may be employed in place of the coaxial cable.

Instead of using two or more reflectors connected to one another by the coaxial cable, data transmission between slave terminals or devices of one reflector may be carried out.

As described in the foregoing, since the present invention does not use a communication cable, the invention permits the installation positions of terminals or computers to be changed freely, reduces the installation cost and eliminates the congestion of communication cables.

Of greater importance is the fact that terminals or computers placed at arbitrary positions can transmit and receive data between the terminals or computers at the same or other arbitrary positions without using communication cables.

What is claimed is:

1. A data communication system comprising: first means for receiving and transmitting optical signals, including first light receiving means for receiving light modulated to communicate data and converting said light into an electric signal and first light emitting means for diffusing and radiating light modulated to communicate data in response to the electrical signal obtained from said first light receiving means; a plurality of second means for transmitting and receiving optical signals, each including second light emitting means disposed in optical communication through the air with said first means for converging and radiating light modulated to communicate data in accordance with a received transmission data signal and second light receiving means in optical communication through the air with said first means for receiving the light from said first light emitting means and converting it into an electrical signal representing receiving data; and third means for transmitting the transmission data signal to a second light emitting means and receiving the electric signal representing receiving data from a second light receiving means.

2. The data communication system as defined in claim 1 including a plurality of said first means connected to one another by a transmission line so that the data obtained by said first light receiving means in one of said first means is transmitted to the first light emitting means in another one of said first means.

3. The data communication system as defined in claim 1 or 2 wherein the light to be radiated by said first and second light emitting means is infrared rays.

4. The data communication system as defined in claim 1 or 2 wherein said third means includes a plurality of data sources each connected to one of said second means, and wherein the data to be transmitted from one data source contains the address of another data source to which the data is to be transmitted.

5. The data communication system as defined in claim 1 or 2 wherein said light emitting means and said light receiving means comprise luminescent diodes and photodiodes, respectively.

6. The data comnunication system as defined in claim 1 or 2 wherein each of said second means includes comparison means for comparing data corresponding to the modulated light radiated from said second light emitting means therein with the data in the modulated light received by said second light receiving means therein, and means responsive to said comparison means for terminating the radiation of light from said second light emitting means therein when said two data do not agree with each other.

7. The data communication system as defined in claim 1 or 2 wherein said third means comprise data terminals or computers.

8. The data communication system as defined in claim 6 wherein said comparison means includes logic circuit means for calculating an exclusive-OR condition between said two data.

* * * * *